United States Patent [19]
Wine

[11] Patent Number: 5,693,395
[45] Date of Patent: Dec. 2, 1997

[54] GLAZED CERAMIC FLOOR TILE HAVING HIGH-RESOLUTION IMAGE

[75] Inventor: Michael M. Wine, New York, N.Y.

[73] Assignee: Imagine Tile, Inc., Jersey City, N.J.

[21] Appl. No.: 413,289

[22] Filed: Mar. 30, 1995

[51] Int. Cl.$^6$ ............................................. B32B 19/00
[52] U.S. Cl. .................. 428/49; 428/67; 428/207; 428/210; 428/432; 428/542.2; 428/699; 428/701; 428/702; 52/311.1
[58] Field of Search ........................ 428/432, 699, 428/701, 702, 210, 207, 542.2, 49, 67, 44; 52/311.1

[56] References Cited

U.S. PATENT DOCUMENTS

| | | | |
|---|---|---|---|
| 257,643 | 5/1882 | Benas | 428/210 |
| 1,334,301 | 3/1920 | Hasburg | 428/210 |
| 3,816,161 | 6/1974 | Buckley | 428/210 |
| 3,857,746 | 12/1974 | Blanco | 428/210 |
| 3,871,293 | 3/1975 | Valiela | 101/41 |
| 4,477,510 | 10/1984 | Johnson et al. | 428/200 |
| 4,584,209 | 4/1986 | Harrison | 428/67 |
| 4,634,634 | 1/1987 | Kondo | 428/701 |
| 4,888,230 | 12/1989 | Cutright | 428/195 |
| 4,939,010 | 7/1990 | Goossens | 428/49 |
| 5,069,960 | 12/1991 | Fukumoto | 428/49 |
| 5,132,165 | 7/1992 | Blanco | 428/210 |
| 5,139,917 | 8/1992 | Hare | 430/138 |
| 5,141,798 | 8/1992 | Chaumonot | 428/210 |
| 5,304,516 | 4/1994 | Clifford | 501/21 |
| 5,330,939 | 7/1994 | Marazzi et al. | 501/32 |
| 5,348,914 | 9/1994 | Thometzek et al. | 501/18 |

OTHER PUBLICATIONS

C.W. Parmelee and revised by C.G. Harman, *Ceramic Glazes*, Mar. 1973.

*Primary Examiner*—Timothy Speer
*Attorney, Agent, or Firm*—Kenyon & Kenyon

[57] ABSTRACT

A decorated ceramic floor tile is disclosed, comprising a clay tile substrate, an initial glaze layer applied to the tile substrate, and a high-fired glazed decal image applied to the tile such that the decal extends substantially at least to the edges of the initial glaze layer around the entire perimeter of the tile substrate. A ceramic floor having a substantially continuous decorative image thereon, comprising a plurality of ceramic floor tiles of the invention also is disclosed. A process for making floor tiles of the invention includes providing a clay tile substrate, bisquing the clay substrate to remove moisture from the clay, applying an initial glaze layer to the bisqued clay tile substrate, performing a first firing of the glazed tile substrate, applying a glazed decal image to the fired glazed tile such that the decal extends substantially at least to the edges of the initial glaze layer, and performing a second firing of the decaled tile such that the decal image is substantially fully bled to the periphery of the tile around the entire perimeter of the tile.

20 Claims, 2 Drawing Sheets

5,693,395

GLAZED CERAMIC FLOOR TILE HAVING HIGH-RESOLUTION IMAGE

FIELD OF THE INVENTION

This invention relates glazed, ceramic floor tiles having high resolution images, and to methods for manufacturing such floor tiles.

BACKGROUND OF THE INVENTION

Ceramics have been long used as the substrate for making tiles that may be used in a variety of environments, including wall tiles and floor tiles. The ceramic material composition, its method of manufacture, and its physical and mechanical properties typically will vary depending on the environment and circumstances in which the tile is employed.

Ceramic tiles conventionally have been manufactured by firing a clay material in a kiln to vitrify the clay. Ceramic tiles often are glazed to provide water, frost, chemical and abrasion resistance. Glaze compositions typically are applied to pre-fired clay which has been subjected to a bisquing process designed to remove moisture from the clay and solidify it somewhat. At the point of firing, the glazes become vitrified and inert, fusing with the ceramic surface to form a substantially single molecular structure.

Although floor tile and wall tile often share some characteristics, such as resistance to water, moisture, and mild chemical agents, they typically differ fundamentally in important characteristics. For example, wall tile may typically be more porous (which permits better adherence to wall substrates) and much less resistant to abrasion than floor tile. In particular, floor tiles need to resist abrasion due to traffic or wheeling of loads and have adequate resistance to skidding, that is, to meet certain coefficient of friction (COF) conditions. In contrast, wall tiles are not required to withstand excessive impact and are not normally subject to freezing and thawing cycles, unless used in an outdoor environment.

Wall tiles may be prepared by firing clay or a mixture of clay and other ceramic materials to produce a relatively thin body that may be either glazed or unglazed. The glaze is a fused facial finish composed of ceramic materials that is usually a vitreous covering that is practically impervious after firing. In some cases, the glaze may be non-vitreous or semi-vitreous. Single-fired glazed tiles are tiles that are glazed before firing. Double-fired glazed tiles may be obtained by firing an unglazed tile substrate, coating the fired tile with glaze and then firing a second time. Double-fired tiles are generally superior in terms of glaze quality and finish. The properties of the glaze composition itself provide the surface sealing, water resistance, etc. To decorate the wall tile, the glaze can be pigmented prior to firing so that the pigmented, fused glaze resulting from the second firing is incorporated onto the surface appearance of the tile.

Alternatively, glazed ceramic tiles can be decorated indirectly through the use of a ceramic decal. Ceramic decals for wall tiles are produced using an overglaze index of colors, that is, a "palette", independently from the actual initial glazing of the tile. To make the decal, an overglaze palette is used in the screening an image onto decal paper for later transfer to the vitrified glazed wall tile. The overglaze is fired onto the tile upon a second firing of the tile. The term overglaze refers to the characteristic of the overglaze to actually sit "on top of" or "over" the substrate glaze.

Overglazing of ceramic wall tiles may be accomplished under low-fire conditions, for example, at temperatures as low as 750°–850° C. Such overglazed ceramic tile should resist the normal demands of wall tile, such as resistance to water, moisture, cleaning agents, mild acids, and fading through ultraviolet light exposure is concerned. However, such tiles will not adequately resist the demands of traffic abrasion experienced in floor applications. Since floor traffic would quickly abrade the surface and deteriorate the finish of such overglazed tiles, they are unsuitable for use as floor tiles. Overglaze colors are designed to be produced using specific firing conditions. In particular, in order for the actual colors to mature properly they must be prepared using exact firing temperatures. Secondly, the characteristic to rest above or "over" the glaze, tends to make overglazes prime candidates for surface abrasion if introduced into a floor context. By contrast, inglaze colors sink "into" the substrate glaze by creating a union with the glaze itself. Once they are fired into the glaze, the inglaze colors are enhanced by the hardness of floor tile glazes which are much harder due to their formulation.

Floor tiles conventionally have been made by employing a high-fire glaze. That is, after subjecting the clay to a bisquing process to remove moisture, a high-fire glaze composition is applied to the tile surface, and the tile may then be fired in a kiln at temperatures of about 1000°–1280° C. for about 45 to about 120 minutes. The actual firing temperature and duration of firing may vary depending on the unique compositions that are specific to each manufacturer. The glaze compositions are designed to withstand such high-firing conditions so as to render a vitrified product after a single firing. The high-firing conditions create a product having the increased resistance to abrasion required for floor tile applications.

Ceramic floor tile conventionally has been decorated using a direct screen method in which the screened material is applied directly to the unfired, glazed clay bisque. In direct screen printing, an image is generally produced using a coarse line screen of about 65 to 85 wherein a decorative stencil is placed over the glazed clay bisque. Ceramic dyes/inks or colored glaze are then applied through the open parts of the screen to the clay using a roller or squeegee. A first firing is then carried out to glaze the decorated clay.

A significant limitation of the direct screen process is that it cannot be wrapped around contoured surfaces but is limited to screening images only on flat surfaces. Conventional ceramic floor tile substrates are "cushioned," that is, provided with rounded edges. Thus, a direct screen decoration of floor tiles cannot fully decorate the entire tile surface since screening does not wrap around the cushioned edges. This is a significant disadvantage since when a plurality of floor tiles are joined to create a floor surface, there will be a discontinuity in the decorative pattern around the edge of each tile. Thus, a true full field image on the floor is not feasible with conventional ceramic floor tiles. In addition, a decal would be unsuitable for application to the clay bisque since a water-soluble decal cannot be attached to a water-soluble pre-fired glaze without the decal losing its definition. Also the decal would destroy the integrity of the unfired glaze. The unfired glaze tile is highly fragile and easily contaminated and damaged upon handling. In addition, the decal cannot be positioned on the tile properly in such a situation.

SUMMARY OF THE INVENTION

In light of the foregoing, there accordingly is a need to provide a decorated floor tile having an image which fully covers a cushioned tile surface, and which enables creation of a full field image on a floor surface constructed with such tiles. There also is a need to provide a floor tile having an image with high resolution. There also is a need to provide a floor tile which incorporates these decorative effects while maintaining satisfactory abrasion and traffic resistance.

In accordance with the invention, there is provided a ceramic floor tile with typical cushioned edges and having a fully bled image thereon. The image can be applied indirectly to a pre-fired, glazed floor tile by providing the tile with an in-glaze composition, for example, through use of a decal process, and then subjecting the tile to a second firing under high-fire conditions to fully bond the image to the tile. The fully bled image obtained with the floor tiles of the invention permits the creation of full field images having excellent abrasion resistance. Thus, with the subject invention, floors having substantially continuous decoration while maintaining resistance to traffic are obtained.

The invention also permits images of superior quality to be applied to ceramic floor tiles with cushioned edges. Magazine-quality graphics can be provided to ceramic floor tiles according to the invention, thereby enhancing the decorative quality of the tiles while maintaining durability.

Further objects and advantages of the subject invention will be apparent to those skilled in the art from the following detailed description of the disclosed glazed ceramic floor tiles having a fully-bled, high-resolution image.

In summary, the subject invention is directed to a method for making a decorative ceramic floor tile having cushioned edges comprising:

(a) providing a ceramic tile substrate having rounded edges, wherein the ceramic tile substrate includes an initial glaze layer that extends to the periphery of the rounded edges of the ceramic tile substrate;

(b) preparing a decal containing an image-forming, high-fire inglaze composition;

(c) applying the decal to the ceramic tile substrate such that the decal extends substantially at least to the periphery of the initial glaze layer; and (d) firing the decaled ceramic tile substrate at a temperature of about 1000° C. to about 1280° C. for a time such that the decal produces an image that is substantially fully bled to the periphery of the ceramic tile substrate.

DETAILED DESCRIPTION OF THE PREFERRED EMBODIMENTS

Figure 1:
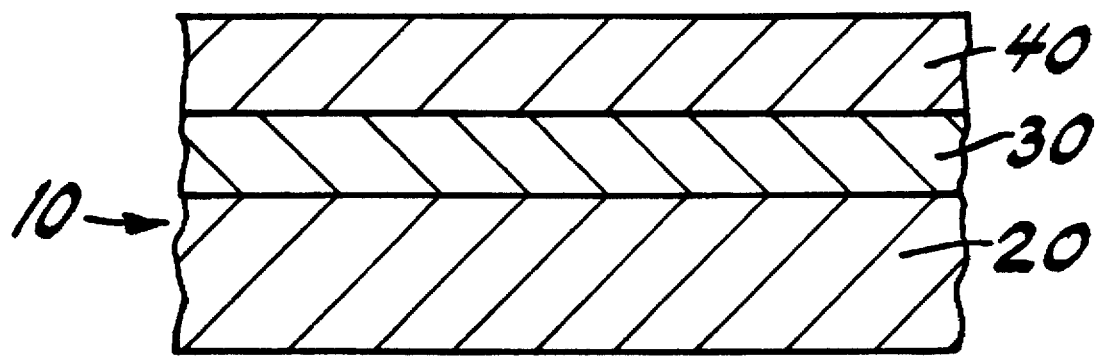
FIG. 1 is a cross-sectional view of a ceramic floor tile of the invention.

The subject invention will now be described in detail for specific preferred embodiments of the invention, it being understood that these embodiments are intended as illustrative examples and the invention is not to be limited thereto.

The present invention relates to a cushioned ceramic floor tile having a fully bled image thereon. The image can be applied indirectly, such as through a decal process, to a pre-fired, glazed floor tile, providing the tile with an in-glaze composition, and then subjecting the tile to a second firing under high-fire conditions to fully bond the image to the tile.

Starting substrates useful in the invention include conventional ceramic glazed and unglazed floor tiles. Preferred substrate materials are comprised of clay containing porcelain. Porcelain clays are typically mixtures of feldspar, kaolin, and quality ball clays. Porcelain clays typically fire at about 1250° C. to about 1280° C. Clays containing about 50 to about 75 weight percent porcelain are particularly preferred. Most preferably, glazed tile comprised of 65% or greater porcelain are used as the tile substitute. These porcelain tiles are generally fired at temperatures of about 1180° C. However, use of porcelain is not required with the invention.

The clay substrates can be shaped according to conventional techniques into tiles of a variety of geometrical shapes, such as squares, rectangles, etc. The tiles can then undergo conventional bisque processing to remove moisture. In a typical commercial process for producing ceramic tiles, after being pressed in a die, tiles are placed in a graduated conveyor inside a drying oven. The oven is essentially a tower, whereby the tiles are lifted to the top and returned on grates, while the tile is slowly heated to evaporate moisture. The temperature generally does not exceed about 800° F.

Next, the clay is glazed and fired according to techniques known in the art. The glaze compositions can be applied wet or as a powder. Wet application is preferred. Typical wet application of glazes include, for instance, painting, pouring, immersion, spraying, or contact transfer techniques known in the art. Glaze compositions commonly used to glaze floor tiles are suitable for use in the first firing of the clay. The cushioned edges are created upon the die-pressing of the clay and are later amplified by the tendency of the glaze to slope down over the edge.

Typical additives which can be useful for floor tile glazing include, for example, carborundum or aluminum oxides, which may be added to provide abrasive qualities to the surface of the tile, or zinc oxides, which may be used as stabilizers. It is important that the glaze composition be chosen so that it can be fired under high-fire conditions to provide an in-glazed tile. As used in this application, high-fire conditions are defined to mean heat working by firing in a kiln at temperatures of about 1000° C. to about 1280° C. for cycle times of about 45 to about 120 minutes. Preferably, the high-fire conditions used for the materials of the subject invention are at least about 1180° C., and most preferably, from about 1180°–1220° C. The application of an inglaze composition refers to the process of firing the inglaze composition at temperatures of at least 1000° C. or, preferably, at least about 1180° C., such as to cause the inglaze composition to fuse into the glaze coating that may already be pre-fired into the tile substrate. Such glaze compositions are herein referred to as high-fire inglaze compositions.

According to one of the preferred embodiments of the subject invention the invention, the pre-fired cushioned ceramic tile substrate provided with a decaled in-glaze and high-fired a second time to create the decorated tile. The preferred decal technique is a water slide method. In this method, the decal is created and printed onto an intermediate medium, such as gummed paper. After printing to the intermediate medium, the decal is then immersed in water, and the decal is slid off the medium and indirectly printed onto the tile. The decal is positioned and applied onto the tile with, for example, a squeegee which flattens the decal and removes water bubbles. In the preferred embodiments of the subject invention, the decal is squeegeed to extend over the rounded edge to the periphery of the initial glaze layer around the entire perimeter of the tile substrate. It was not expected by those skilled in the art that a glaze could be applied to the tile substrate so as to produce a fully-bled image. Full bleeding of the image refers to the fact that the image extends at least to the rounded edge and, preferably, around the rounded edge all the way to the periphery of the pre-fired glaze layer.

The subject invention, as disclosed herein, is directed to an in-glaze duotone or two-color product. In addition, the decal can be created using a monotone, tritone, quadtone, flat color, line or four-color process palette to achieve high-quality, full-color images. The four colors preferred for use in the decal of the four color process are cyan, yellow, magenta and black.

A significant advantage, and preferred embodiment, of the invention is its ability to incorporate high resolution graphics in the decal. Preferably, particles refined to be consistent with a screen of about 200 to about 325 mesh is used to create the decal. A decal image having graphics resolution of about 60 to about 110, and more preferably, about 85 to about 150 line screen, can be obtained using such screens. The term "line screen" is defined herein according to graphics printing industry standards. Such images approximate the graphics resolution found in typical magazine printing.

Optionally, digital creation or editing of images can be employed to indirectly print via ceramic decaling a digitized image onto a ceramic floor tile. For example, using commercially available desktop publishing software, an image can be created, refined, or edited and stored in digital form. The digital image can then be transferred to color separations that are useful in the decaling of the present invention. A color separation software program sold under the trade name ADOBE PHOTOSHOP®, ADOBE® ILLUSTRATOR or QUARK® XPRESS are preferred embodiments for transferring a digital image to the decaling process.

In one embodiment of the invention, a photograph can be used as the image to be indirectly printed onto glazed ceramic floor tile. The photograph can be in the form of (a) a print, (b) a chrome or (c) a 35 mm slide which is transferred to digital format using electronic scanning equipment. Alternatively, a digitally-formatted CD ROM may be used which precludes the need for electronic scanning. If desired, the digital image created from the photograph can be edited or refined using desktop publishing software prior to color separations for decaling. In an alternate embodiment, it may be possible to use digital photography with the invention. Thus, a digital photographic image may be directly created, optionally edited or refined, and then subjected to digital color separation for decaling.

The inventor has discovered that high-fire glazes, which are required for creation of abrasion-resistant floor tiles, can be incorporated into a decaling process capable of producing high-quality graphics. The particular glaze composition is not critical, and can be modified according to techniques known in the art. The glaze powder may be suspended in an acrylic vehicle that has a viscosity so that it can pass through a mesh screen fine enough to create the images.

The composition should contain sufficient additives such that it will vitrify under high-fire conditions to produce a glazed tile having an abrasion wear index of about 100 or greater as measured using an ASTM C 501 Abrasion Hardness test in a porcelain paver. More preferably, the ASTM C 501 abrasion wear index value is about 150 or greater. Using the Mohs Scale scratch hardness rating, the scratch hardness is preferably about 6.5 or greater, more preferably, 7.0 or greater, on the Mohs Scale. A scratch hardness of about 7 on the Mohs Scale is equivalent to the hardness of quartz and corresponds to about 4 or greater using the tile industry wear rating guide. A "4" wear rating is described by the tile industry as "Heavy Traffic" suitable for all residential applications and, also for heavy duty commercial, retail and institutional use. A "4+" wear rating is described as "Extra Heavy Traffic" suitable for all residential and commercial application as well as for use where maximum traffic and other circumstance require optimum durability.

In addition to the in-glaze finishes of the subject invention, fluxes may also be included which provide coatings having an added resistance to traffic abrasion. The flux is preferably a modified high-calcium borosilicate, for example, containing about 40% borosilicate, 5-10% alumina and 30% oxides of sodium, calcium, potassium or strontium. The firing temperature of the flux is preferably compatible with the preferred glaze temperatures of from about 1180° to 1220° C. The flux may be introduced into the decal as an overcoat or introduced separately in individual passes. The flux is preferably ground to a particle size finer than about 325 so as to provide easier manipulation.

In the process of applying the decal to the substrate, once the decal is printed onto the intermediate medium, it can then be immersed in water and transferred onto the glazed ceramic substrate. When the tile is fired a second time, any of the decal glaze which is not in contact with the initial glaze on the tile will be burned away. If the firing is carried out properly, substantially all of the decal glaze which is in contact with the initial glaze layer will be fused with the initial glaze layer. Thus, application of the decal glaze should be carried out so as to contact the entire initial glaze layer with the decal glaze. In particular, in order to fully bleed the image to the cushioned edges of the tile, the decal should be wrapped around the edges of the tile to a position slightly beyond the interface of the clay and initial glaze. Positioning the decal in this manner will cause the decal to burn back to a position substantially identical to the interface of the clay and initial glaze such that the image will be substantially fully bled to the periphery of the tile around the entire perimeter of the tile.

The second firing of the tile is preferably carried out in a roller hearth kiln (RHK) at a temperature of about 1175° C. to about 1280° C. for cycle times of about 45 to about 120 minutes. The firing may also be carried out using a longer cycle up to 9 hours, for example, in a shuttle kiln. It has been found that the second firing creates an in-glaze of the decal image without adversely impacting the graphics quality of the image. Thus, the image is embedded in the tile, which is provided with a high degree of abrasion resistance, suitable for use as floor tiling. Proper positioning of the decal prior to the second firing yields a fully bled image.

The techniques of this invention permit the creation of floor tiles which yield floors having a substantially continuous decoration while maintaining resistance to traffic. Although minimal discontinuity between tiles may occur due to grouting placed between individual tiles to provide a sealed floor surface, the tiles themselves will be substantially fully decorated so that the resulting tile-to-tile image is substantially continuous. Particularly when used with the high-quality graphics which can be obtained, the invention permits creation of floor surfaces having excellent abrasion resistance and high-quality, substantially continuous images.

Optionally, the process can include incorporating flux materials into the floor tiles of the invention. The flux coatings preferred for use with the invention are formulations chiefly of silica and alumina that assist in providing a barrier of hardened glass upon firing. The flux composition can be added to the surface of the tile, after application of the decal glaze, prior to the second firing of the tile.

The glaze composition in the decal of the subject invention produces a glazed image layer that may be less than about 100 microns thick, preferably about 5 to about 30 microns thick, and more preferably about 8 to about 15 microns thick. In the most preferred embodiment of the subject invention disclosed herein, the glazed image layer is about 10 microns thick. The flux preferably produces a flux layer, that is, an overcoat, having a thickness of 10 microns or more. However, a thicker flux layer may be provided of up to about 100 to about 120 microns.

A cross-sectional view of a ceramic floor tile of the invention is depicted in FIG. 1. The tile 10 comprises a clay tile body 20, an initial glaze layer 30 adjacent the tile body, and a vitreous glazed image layer 40 adjacent the initial glaze layer. Glaze layer 30 fuses with tile body 20 during the initial firing of the tile. As such, it is believed to acquire a molecular structure relatively homogeneous with the tile body. However, it is shown as a distinct layer in FIG. 1 for ease of reference. Likewise, the vitreous glazed image layer 40 is believed to become in-glazed with, that is, fired at least partially into the surface of the initial glaze layer 30 upon the second firing of the tile. It is to be understood that the initial glaze layer may be fired for the first time after applying the image layer, in particular, without first prefiring the initial glaze layer by itself with the ceramic tile substrate before applying the image layer.

Figure 2:
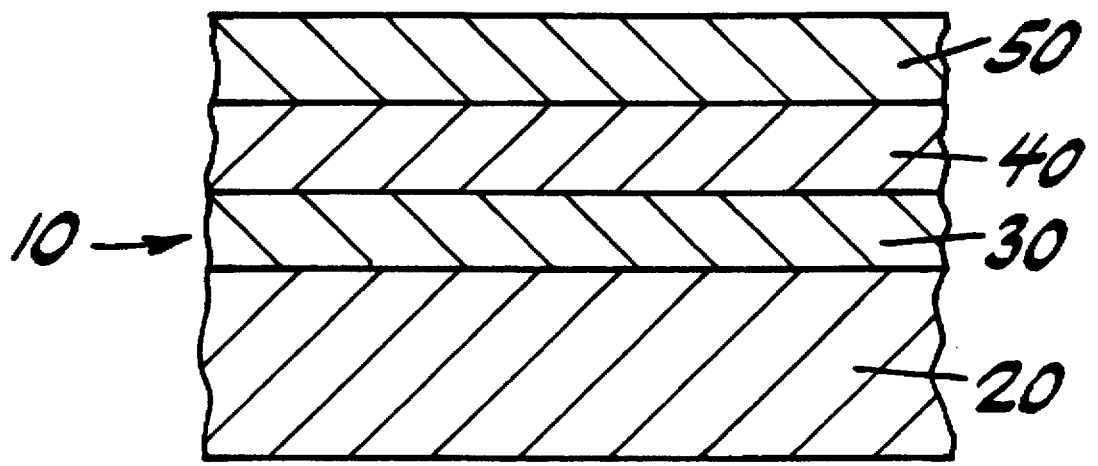
FIG. 2 is a cross-sectional view of an alternate embodiment of a ceramic floor tile of the invention.

FIG. 2 depicts a cross-sectional view of an alternate embodiment of a ceramic floor tile of the invention. The tile of FIG. 2 is similar to that of FIG. 1, with the addition of a layer 50, which is herein referred to as the flux layer that is adjacent to the vitreous glazed image layer 40. The flux layer, preferably, also forms a substantially continuous layer with the underlying layer with which it is in direct contact.

Figure 3:
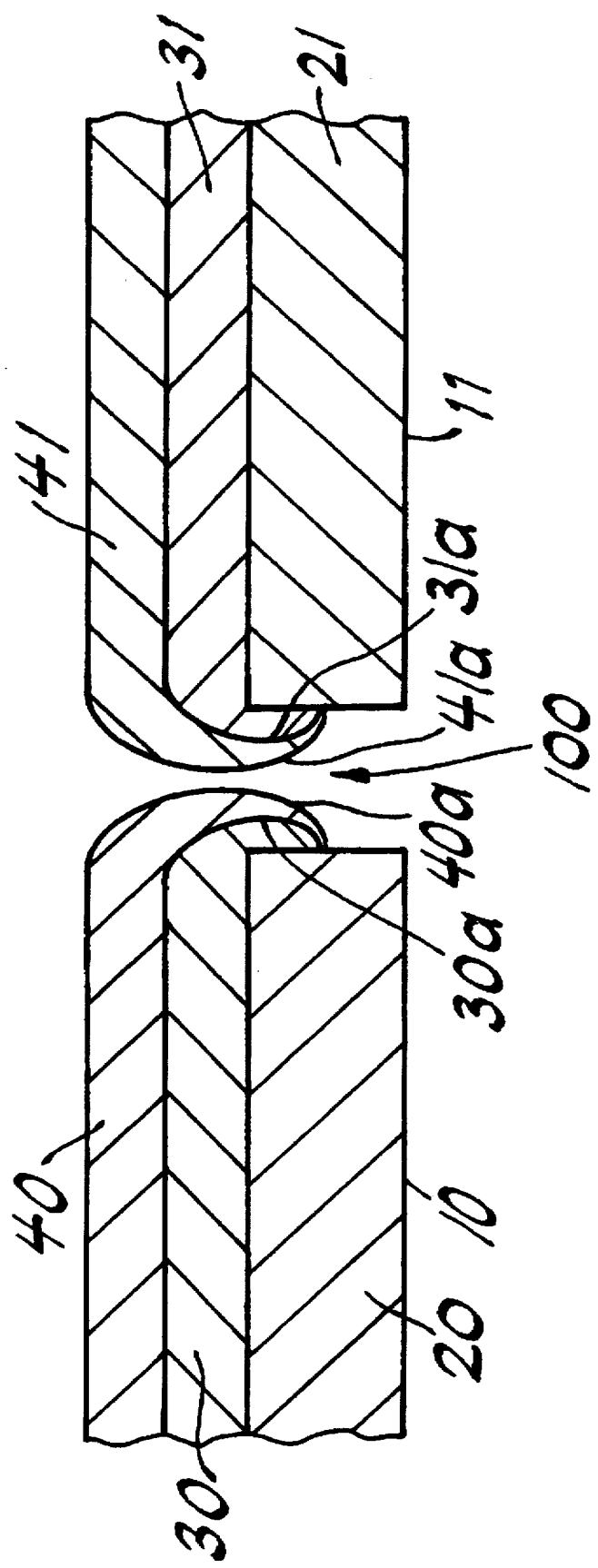
FIG. 3 is a side view of two imaged cushioned ceramic floor tiles of the invention.

FIG. 3 is a side view of two imaged cushioned ceramic floor tiles of the invention. Tile bodies 20 and 21 of tiles 10 and 11 have adjacent thereto initial glaze layers 30 and 31, vitreous glazed image layers 40 and 41, respectively. The embodiment shown does not include a flux layer, although one could be provided above or within the vitreous glazed image.

As can be seen from FIG. 3, at the interface 100 of the two tiles, the initial glaze layer is cushioned around the edge at sections 30a and 31a. The decal extends to the edge of the initial glaze, and wraps sufficiently around the edge of the tile to provide a full bleed image. In this manner, as the tiles are assembled, a substantially continuous image can be created across a floor surface.

AN EXAMPLE OF THE INVENTION

In an illustrative example of the invention, pre-fired glazed ceramic floor tiles having dimensions of 12"×12"×⅝" were obtained from Summitville Tile Company of Morganton, N.C. The tile substrate composition was comprised of about 65% feldspar and the rest ball clay and talc clay. The tiles were decorated with a decal, which was supplied by Philadelphia Decal of Philadelphia, Pa., having an image formed from an inglaze composition comprised essentially of green and black inglaze colors. The duotone image thus produced had been obtained by scanning a print of a custom photograph of leaves. The decal included a flux that was comprised chiefly of alumina and silica.

The decal was squeegeed onto the tile substrate so that the image was substantially at least to the edges of the initial glaze layer. Before firing, the decal image had a thickness of about 10 microns with a flux coating thickness of about 120 microns. The tile substrate was then fired using a peak temperature of about 1180° C. during a 2 hour cycle from start to finish, such that the decal produced a substantially fully bled image to the periphery of the tile around the entire perimeter of the tile.

The image thus produced had a line screen resolution of about 85. The floor tile thus formed had an ASTM C 501 Abrasion Hardness of about 150 as measured on the abrasion wear index and a scratch hardness on the Mohs Scale of about 7.0, which is equivalent to the hardness of quartz and corresponds to the tile industry wear rating of at least 4 or higher. A full floor covering containing the tiles produced a substantially continuous image wherein the boundaries between the individual tiles were barely perceptible.

It is to be understood that the steps and materials of the above-recited example are intended to be illustrative only and that the invention is not intended to be limited to the materials, conditions, process parameters and the like recited herein. In particular, one skilled in the art may use other combinations of materials, conditions, process parameters and the like while still remaining within the scope of the subject invention.

What is claimed is:

1. A decorated floor tile comprising:
   a ceramic floor tile comprised of
   (a) a ceramic tile substrate having rounded edges;
   (b) an initial glaze layer in direct contact with the ceramic tile substrate, wherein the initial glaze layer extends to the periphery of the rounded edges of the ceramic tile substrate; and
   (c) a glazed image layer fired into the surface of the initial glaze layer, wherein the image is substantially fully bled to the periphery of the ceramic tile substrate.

2. A floor surface having a substantially continuous decorative image thereon, comprising a plurality of the decorated floor tiles of claim 1.

3. The decorated floor tile of claim 1 wherein the image is substantially fully bled to the periphery of the ceramic tile substrate around the entire perimeter of the ceramic tile substrate.

4. The decorated floor tile of claim 1 wherein the ceramic tile substrate contains about 50 to about 75 weight percent porcelain.

5. The decorated floor tile of claim 1 wherein the image on the ceramic floor tile has a resolution of at least about 60 line screen.

6. The decorated floor tile of claim 5 wherein the floor tile has a wear rating guide value of at least 4.

7. The decorated floor tile of claim 6 wherein the ceramic floor tile has an ASTM C 501 Abrasion Hardness of 100 or greater on the abrasive wear index.

8. The decorated floor tile of claim 7 wherein the floor tile has a scratch hardness on the Mohs scale of at least 6.5.

9. The decorated floor tile of claim 8 wherein the image on the ceramic floor tile has a resolution greater than about 85 line screen.

10. The decorated floor tile of claim 8 wherein the floor tile has a wear rating guide value of at least 4+.

11. The decorated floor tile of claim 8 wherein the ceramic floor tile has an ASTM C 501 Abrasion Hardness of 150 or greater on the abrasive wear index.

12. The decorated floor tile of claim 8 wherein the floor tile has a scratch hardness on the Mohs scale of at least 7.

13. A decorated floor tile with a high wear rating guide value comprising:
   a ceramic floor tile comprised of
   (a) a ceramic tile substrate having rounded edges;

(b) an initial glaze layer in direct contact with the ceramic tile substrate; and (c) a glazed image layer fired into the surface of the initial glaze layer, wherein the image on the ceramic floor tile formed has a resolution of at least about 60 line screen and the ceramic floor tile has a wear rating guide value of at least 4.

14. The decorated floor tile of claim 13 wherein the ceramic tile substrate contains about 50 to about 75 weight percent porcelain.

15. The decorated floor tile of claim 14 wherein the ceramic floor tile has an ASTM C 501 Abrasion Hardness of 100 or greater on the abrasive wear index.

16. The decorated floor tile of claim 15 wherein the ceramic floor tile has a scratch hardness on the Mohs scale of at least 6.5.

17. A decorated floor tile with high abrasion hardness comprising:

a ceramic floor tile comprised of
 (a) a ceramic tile substrate having rounded edges:
 (b) an initial glaze layer in direct contact with the ceramic tile substrate; and
 (c) a glazed image layer fired into the surface of the initial glaze layer, wherein the image on the floor tile formed has a resolution of at least about 60 line screen and the ceramic floor tile has an ASTM C 501 Abrasion Hardness of 100 or greater on the abrasive wear index.

18. The decorated floor tile of claim 17 wherein the ceramic tile substrate contains about 50 to about 75 weight percent porcelain.

19. A decorated floor tile with high scratch hardness comprising:

a ceramic floor tile comprised of
 (a) a ceramic tile substrate having rounded edges:
 (b) an initial glaze layer in direct contact with the ceramic tile substrate; and
 (c) a glazed image layer fired into the surface of the initial glaze layer; wherein the image on the floor tile has a resolution of at least about 60 line screen and the ceramic floor tile has a scratch hardness on the Mohs scale of at least 6.5.

20. The decorated floor tile of claim 18 wherein the ceramic tile substrate contains about 50 to about 75 weight percent porcelain.

* * * * *